United States Patent
Subramanian et al.

(10) Patent No.: US 12,043,077 B2
(45) Date of Patent: Jul. 23, 2024

(54) AIR SUSPENSION SYSTEM HAVING A DAMPED LINKAGE ROD ASSEMBLY FOR CONTROLLING A HEIGHT-LEVELING AIR VALVE

(71) Applicant: VOLVO TRUCK CORPORATION, Gothenburg (SE)

(72) Inventors: Chidambaram Subramanian, Greensboro, NC (US); Jared Landau, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/344,115

(22) Filed: Jun. 29, 2023

(65) Prior Publication Data
US 2024/0010042 A1    Jan. 11, 2024

(30) Foreign Application Priority Data

Jul. 11, 2022    (EP) ..................................... 22184143

(51) Int. Cl.
B60G 17/056    (2006.01)
(52) U.S. Cl.
CPC .... B60G 17/0565 (2013.01); *B60G 2202/152* (2013.01); *B60G 2500/302* (2013.01); *B60G 2600/21* (2013.01); *B60G 2800/01* (2013.01); *B60G 2800/914* (2013.01)
(58) Field of Classification Search
CPC .......... B60G 17/0565; B60G 2202/152; B60G 2500/302; B60G 2600/21; B60G 2800/01; B60G 2800/914
See application file for complete search history.

(56) References Cited

U.S. PATENT DOCUMENTS

| | | | | |
|---|---|---|---|---|
| 2,792,235 | A | * 5/1957 | Federspiel | ....... B60G 17/01925 |
| | | | | 280/124.16 |
| 3,013,809 | A | 12/1961 | Szostak | |
| 9,399,474 | B2 | * 7/2016 | Hojak | ....................... B61F 5/14 |
| 11,207,935 | B2 | * 12/2021 | Harrison | ............ B60G 17/0525 |
| 2010/0032599 | A1 | 2/2010 | Herges et al. | |
| 2012/0319366 | A1 | 12/2012 | Yagiela | |

FOREIGN PATENT DOCUMENTS

| | | |
|---|---|---|
| EP | 2006131 A2 | 12/2008 |
| EP | 2006131 A3 | 1/2009 |
| GB | 862896 A | 3/1961 |

OTHER PUBLICATIONS

Extended European Search Report in corresponding European Application No. 22184143.0 dated Dec. 6, 2022 (5 pages).

* cited by examiner

*Primary Examiner* — Faye M Fleming
(74) *Attorney, Agent, or Firm* — Venable LLP; Jeffri A. Kaminski

(57) ABSTRACT

A levelling valve assembly for an air suspension system of a heavy vehicle is provided, including an air valve configured to allow air to either enter or escape from an air spring based on a position of a control arm of the air valve, and including a linkage rod assembly configured to translate movement between a sprung and unsprung mass of the vehicle into a rotation of the control arm to regulate a ride height of the vehicle. The linkage rod assembly further includes a spring and damper arrangement configured to dampen or block movement of the control arm not caused by a change in a mass loading of the vehicle.

10 Claims, 3 Drawing Sheets

AIR SUSPENSION SYSTEM HAVING A DAMPED LINKAGE ROD ASSEMBLY FOR CONTROLLING A HEIGHT-LEVELING AIR VALVE

TECHNICAL FIELD

The present disclosure relates to the field of air (spring) suspensions in heavy vehicles. In particular, the present disclosure relates to the damping of unwanted opening and closing of a control air valve in such a system to reduce unnecessary air consumption.

BACKGROUND

A modern heavy vehicle (such as a truck or other utility vehicle) is often equipped with an air suspension system in which an airflow to/from one or more air springs are controlled in order to regulate a ride height of the vehicle. A simple yet reliable solution includes to provide an air valve between an air reservoir and an air spring, and to use a linkage rod provided such that it converts relative movement between the wheels and chassis of the vehicle into a motion of a control arm of the air valve. If a distance between the wheels and chassis increases from a preset value (as determined e.g. by a length of the linkage rod), the control arm is moved by the linkage rod in a direction such that air is allowed to escape from the air spring. Likewise, if the distance between the wheels and chassis instead decreases from the preset value, the control arm is moved by the linkage rod in an opposite direction such that air is instead allowed to enter the air spring from the air reservoir. By so doing, such a leveling system may mechanically regulate a ride height of the vehicle automatically as the vehicle is loaded or unloaded as part of a delivery mission. If the loading of the vehicle is increased (as a result of e.g. picking up more cargo), the leveling system will compensate by supplying more air to the air spring(s) to keep the ride-height unchanged, and similarly if the vehicle is unloaded (as a result of e.g. dropping of cargo).

A disadvantage of the above-described leveling system however arises because all relative movements between the wheels and chassis are not necessarily due to a change of the loading of the vehicle. Instead, any movement caused by e.g. the vehicle driving over a bump in the road, by the vehicle accelerating or decelerating, turning, or similar, will cause the air valve to repeatedly direct air to and from the air spring, leading to an increased consumption of air and thereby also to a negatively affected fuel economy (as e.g. a compressor driven by the vehicle's engine needs to work harder to repeatedly refill the air reservoir).

In an attempt to solve the above issue, one common alternative includes to add electronics for controlling the air valve. An electronic control unit (ECU) may for example be provided to take readings from one or more sensors (such as acceleration sensors, pressure sensors, tilt sensors, and similar) in order to determine when to allow the air valve to alter the flow of air to/from the air spring(s), in order to reduce unnecessary air consumption. Another common alternative includes modifying the air valve itself such that some amount of damping is provided within the air valve, e.g. such that movements of its control arm having a certain frequency (or belonging to one or more particular frequency intervals) are blocked or damped, which may also reduce the air consumption if these frequencies/frequency intervals correspond to movements caused by e.g. rough road surfaces, acceleration, deceleration, turning, or similar, but not to movements caused by a change of the vehicles total mass.

Such common solutions do however have in common that they are often rather expensive and complex to both construct, install and maintain, and their overall increased costs are therefore not necessarily motivated by the savings to be had from the reduced air consumption.

SUMMARY

Due to the above-discussed issues, there is therefore a need to provide a more simple and cost-effective solution for how to avoid unnecessary air and fuel consumption in such air suspension systems when used for ride height control. To at least partially satisfy this identified need, the present disclosure provides an improved leveling valve assembly, an air suspension system, and a heavy vehicle.

According to a first aspect of the present disclosure, there is provided a leveling valve assembly for an air-suspension system for a heavy vehicle. The assembly includes an air valve which is mountable to one of a sprung mass (such as a chassis of the vehicle) and unsprung mass (such as one or more wheel axis of the vehicle, or similar). The air valve includes a supply port, a suspension port, an exhaust port, and a control arm. Using the control arm, the air valve is operable between at least a first state in which the supply port is directed to the suspension port (such that air may enter into an air spring connected to the suspension port from an air reservoir connected to the supply port), and a second state in which the suspension port is directed to the exhaust port (such that air may escape from the air spring via the exhaust port). The assembly further includes a linkage rod assembly mounted, in a first end, to the control arm of the air valve, and which is mountable in another, second end to another one of the sprung and unsprung mass of the vehicle. The linkage rod assembly is configured to translate a relative movement between the sprung mass and unsprung mass of the vehicle into a movement of the control arm, to thereby regulate a ride height of the vehicle (as described earlier herein). In particular, in the first aspect of the present disclosure, the linkage rod assembly further includes a spring and damper arrangement inserted in between the first and second ends of the linkage rod assembly. The spring and damper arrangement is configured to dampen or block movement of the control arm due to relative movement between the sprung mass and unsprung mass of the vehicle not caused by a change in a mass-loading (i.e. weight) of the vehicle. As described earlier herein, this may be achieved e.g. by tuning the spring and damper arrangement (in terms of e.g. one or more resonant frequencies, damping constants, etc., thereof) such that it only or mostly damps oscillations at one or more frequencies associated with e.g. road bumps, acceleration, deceleration, turning, or similar. Phrased differently, the fact that loading/unloading of the vehicle is often performed slowly, such that changes in the relative displacement between the sprung and unsprung mass caused by such loading/unloading of the vehicle occur at one or more frequencies which are separated from the frequency/ frequencies of oscillations caused by such things other than loading/unloading of the vehicle. In other words, the spring and damper arrangement allows to dampen/absorb non-static/non-sustained movements which are not caused by changes to the loading of the vehicle. When installed in a vehicle, the air valve may be mounted to a sprung mass of the vehicle while the second end of the linkage rod is mounted to an unsprung mass of the vehicle, or vice versa.

The envisaged solution thus improves upon currently available technology in that it avoids the need for e.g. complex and expensive ECU-based controls and sensors, and also avoids the need to internally modify the air valve itself. Instead, the same effect is achieved by modifying the linkage rod, i.e. by providing the damping as part of the linkage rod itself. This also enables easier upgrades of already installed air suspension systems, in that it is envisaged to be less complex to replace and/or modify the linkage rod assembly than to e.g. replace the air valve, and/or to e.g. add electronic control which requires one or more sensors. The envisaged solution also offers a less complex maintenance and repair, as the linkage rod assembly is easier to access and diagnose compared with e.g. the internals of the air valve or the electronics of an ECU.

In some embodiments of the assembly, an apparent stiffness and/or damping of the spring and damper arrangement may be variable. This may e.g. allow to efficiently damp oscillations caused by road profile bumps or similar, and to also damp oscillations due to larger and more rapid load transfers such as those caused by acceleration, braking or turning of the vehicle.

In some embodiments of the assembly, the variable apparent stiffness of the spring and damper arrangement may e.g. be obtained by a spring element of the spring and damper arrangement being a trapezoidal spring.

In some embodiments of the assembly, a spring element of the spring and damper arrangement may be made of a shape-memory alloy. Such a spring element is further advantageous in that its stiffness may be varied dynamically, by e.g. heating or cooling the spring element as desired.

In some embodiments of the assembly, a damping element of the spring and damper arrangement may include (or be) a (magneto- or electro-)rheological fluid. Such a damping element may be advantageous in that the damping capability of the spring and damper arrangement may be dynamically varied, by e.g. applying (or varying) a magnetic and/or electric field. It is also envisaged to use other types of "smart fluids", such as e.g. a ferrofluid or similar, whose damping-related properties may be tuned dynamically.

In some embodiments of the assembly, the control arm (of the air valve) may be rotatably mounted to the air valve and configured to operate the air valve between at least the first and second states by rotating around at least one axis.

In some embodiments of the assembly, the assembly may further include a heating element for heating the spring element, and a control unit configured to control the heating element based on at least one of a received indication of a roughness of a road on which the vehicle is travelling and a received indication of a lateral and/or longitudinal acceleration of the vehicle. Although requiring the addition of a control unit, such a control unit may be constructed more simple and cheaper than a control unit for a full electronic suspension system, and may be used to e.g. vary the apparent stiffness of the spring and damper arrangement depending on current driving conditions, in order to reduce unnecessary air consumption. For example, if driving on a rough road, or during stop and go (or any rapid acceleration and/or deceleration/braking), the apparent stiffness of the spring and damper arrangement could be reduced by adjusting the heat of the memory-shape alloy in the spring element in order to make the spring/damper softer, such that the oscillations between e.g. the chassis and wheels are damped and not translated into movement of the control arm of the air valve.

In some embodiments of the assembly, the fluid may be magnetorheological, and the assembly may further include means (such as an electromagnet) for generating a magnetic field in the magnetorheological fluid, and a control unit configured to control the electromagnet and the generated magnetic field based on at least one of a received indication of a roughness of a road on which the vehicle is travelling and a received indication of a lateral and/or longitudinal acceleration of the vehicle. Just as for the heating element and shape-memory alloy, the damping of the spring and damper arrangement may thus be dynamically adjusted based on current driving conditions, to better damp unwanted oscillations such that they do not translate into movement of the control arm of the air valve.

Similarly, in some embodiments of the assembly, the fluid may instead (or in addition) be an electrorheological fluid, and the assembly may further include e.g. means for generating an electric field in the fluid, and a control unit configured to control this electric field.

According to a second aspect of the present disclosure, there is provided an air suspension system for a heavy vehicle. The system includes a level valve assembly as described herein (e.g. the assembly of the first aspect or any embodiment thereof envisaged and described herein). The system further includes an air spring which is mountable between the sprung mass and unsprung mass of the vehicle, and connected to the suspension port of the air valve. The system further includes an air supply connected to the supply port of the air valve (for supplying air to the air spring when allowed by the air valve).

According to a third aspect of the present disclosure, there is provided a heavy vehicle. The heavy vehicle includes an air suspension system (e.g. the air suspension system of the second aspect, or any embodiment thereof envisaged and described herein). The air valve is mounted to one of a sprung mass and unsprung mass of the vehicle. The second end of the linkage rod assembly is mounted to another one of the sprung mass and unsprung mass of the vehicle, and the air spring is mounted between the sprung mass and unsprung mass of the vehicle (to dampen relative movement therebetween).

Other objects and advantages of the present disclosure will be apparent from the following detailed description, the drawings and the claims. Within the scope of the present disclosure, it is envisaged that all features and advantages described with reference to e.g. the assembly of the first aspect are relevant for, apply to, and may be used in combination with also any feature and advantage described with reference to the system of the second aspect, and the heavy vehicle of the third aspect, and vice versa.

BRIEF DESCRIPTION OF THE DRAWINGS

Exemplifying embodiments will now be described below with reference to the accompanying drawings, in which.

Figure 1:
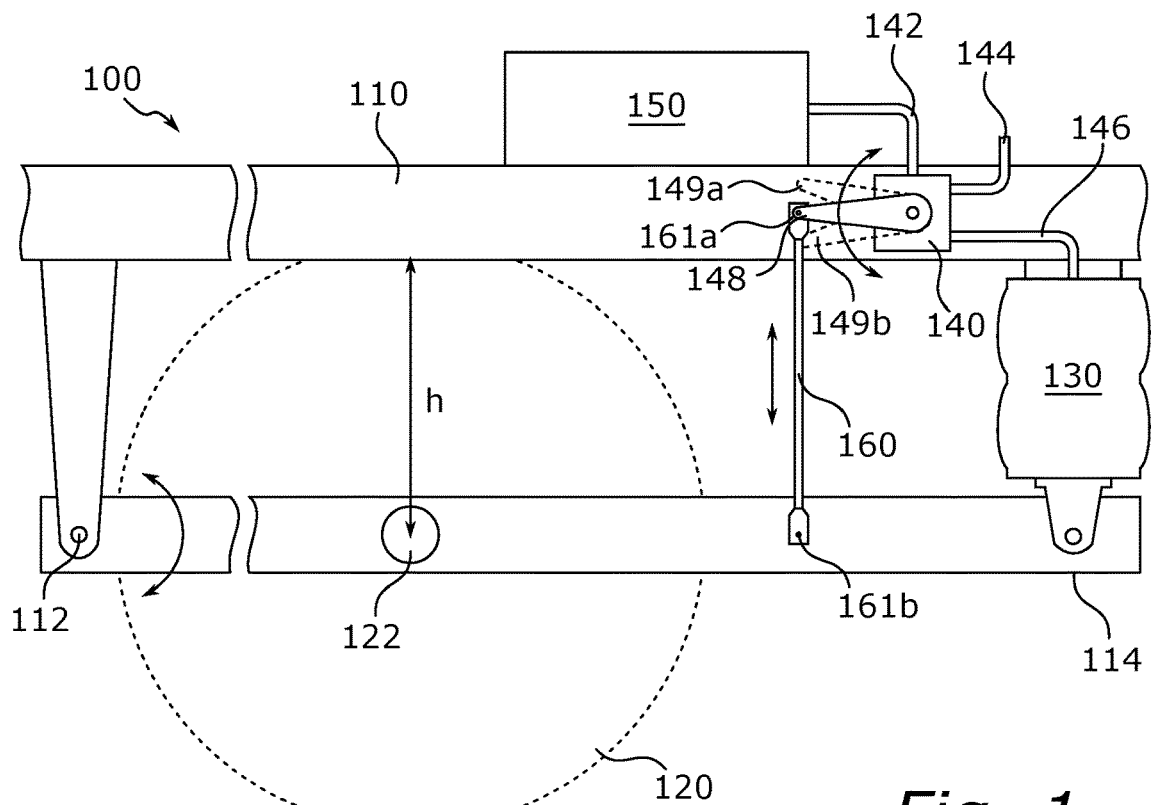
FIG. 1 schematically illustrates an example of a conventional air suspension system configured for levelling/regulating a ride height.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

An example of a conventional air suspension system will now first be described with reference to FIG. 1.

FIG. 1 schematically illustrates a conventional air suspension system 100 of a heavy vehicle. The system 100 includes a sprung mass (here illustrated by part of a chassis 110 of the vehicle) and an unsprung mass (here illustrated by a beam 114, wheel axis 122 and wheel 122). The beam 114 is rotatably mounted to the chassis no at a first pivot point 112, such that the beam 114 may rotate about the point 112 and thereby allow a relative displacement h between the chassis 110 and the wheel axis 122. To provide damping of the relative movement between the chassis no and the beam 114/wheel axis 122, an air spring 130 is provided and mounted between the chassis 110 and the beam 114. The air spring 130 includes a bellow which may be filled with air, such that the stiffness and/or size of the air spring 130 can be increased by supplying more air to the bellow of the air spring 130, or reduced by removing air from the bellow of the air spring 130.

To control the flow of air to/from the air spring 130, the system 100 includes an air valve 140. The air valve 140 has a supply port 142, an exhaust port 144, and a suspension port 146. To supply air to the air spring 130, an air reservoir 150 is provided and connected to the supply port 142. It is envisaged that the air reservoir 150 may e.g. be refilled as desired using a compressor (not shown) or similar, which may e.g. be driven by an engine of the vehicle in which the system 100 is installed. The air spring 130 is in turn connected to the suspension port 146 of the air valve 140.

The air valve 140 further includes a control arm 148 which is operable/rotatable between at least a first position 149a and a second position 149b, as indicated by the dashed outlines of the control arm 148 in FIG. 1. The air valve 140 is configured internally such that when the control arm 148 is in the first position 149a, the air valve 140 is in a first state in which the supply port 142 is directed to the suspension port 146, such that air may enter into the air spring 130 from the reservoir 150. The air valve 140 is further configured such that, when the control arm 148 is in instead in the second position 149b, the air valve 140 is instead in a second state in which the suspension port is directed to the exhaust port 144, such that air may exit from the air spring 130 via the exhaust port 144. The air valve 140 and the control arm 148 may of course also be so configured that there are one or more intermediate positions in both directions of movement of the control arm 148, corresponding to one or more intermediate states of the air valve 140, wherein e.g. a smaller displacement/rotation of the control arm 148 from the neutral position shown in FIG. 1 causes a smaller movement of air (measured e.g. in volume per time) to/from the air spring 130, and such that a larger displacement/rotation of the control arm 148 from the neutral position causes a larger movement of air to/from the air spring 130. The size of air movement (i.e. the air flow) may depend linearly on the amount of displacement/rotation of the control arm 148, or the dependence may be nonlinear.

To use the air spring 130 to adjust a ride height of the vehicle, e.g. to keep the relative displacement h at or close to a preset value as shown in FIG. 1, the system 100 further includes a linkage rod 160 which is connected in a first end 161a to the control arm 148, and which is connected in a second end 161b to the bar 114. As a result, a relative movement between the bar 114 and chassis no will be translated (by the linkage rod 160) into a movement of the control arm 148. Consequently, if the relative displacement h becomes smaller than shown in FIG. 1, the linkage rod 160 will force the control arm 148 to rotate towards (or to, or beyond) the first position 149a such that air is allowed to enter from the air reservoir 150, via the supply port 142 and the suspension port 146, and into the air spring 130. The air spring 130, as it becomes filled with more and more air, will force the bar 114 and chassis no more apart, and thus make the relative displacement between the bar 114 and chassis no more equal to the preset value as shown in FIG. 1 again. Similarly, if the relative displacement h becomes larger than shown in FIG. 1, the linkage rod 160 will instead force the control arm 148 to rotate towards (or to, or beyond) the second position 149b, which will allow air to escape from the air spring 130. The air spring 130, as more air is released therefrom, will then allow the bar 114 to swing closer to the chassis no again, thereby also making the relative displacement between the bar 114 and chassis 110 closer (or equal) to the preset value shown in FIG. 1. The linkage rod 160 thus enables to use the system 100 to regulate the ride height of the vehicle to a preset value. As mentioned earlier herein, when driving e.g. on a rough road, or when accelerating, decelerating and/or turning, the linkage rod 160 may repeatedly force the control arm 148 to rotate back and forth, and thereby cause the air valve 140 to repeatedly allow air into and out from the air spring 130, resulting in an increased air consumption not related to an actual change of mass of the vehicle. In an optimal scenario, air would only be consumed for relative displacements between the bar 114 and chassis no caused by changing of a loading (e.g. a change of the total mass) of the vehicle. As used herein, a "displacement" between the bar 114 and chassis no is to be understood as a change in the pivoting angle at the point 112, such that a portion of the bar 114 closer to the connection of the air spring 130 to the bar 114 moves closer to, or further from, the chassis no. Further, herein, the air valve 140, control arm 148 and e.g. the linkage rod 160 is jointly referred to as a leveling valve assembly for the air suspension system 100.

How the present disclosure envisages to at least partially make the situation more like the above-described optimal situation will now be described with reference also to FIGS. 2A, 2B, 2C and 3.

Figure 2A:
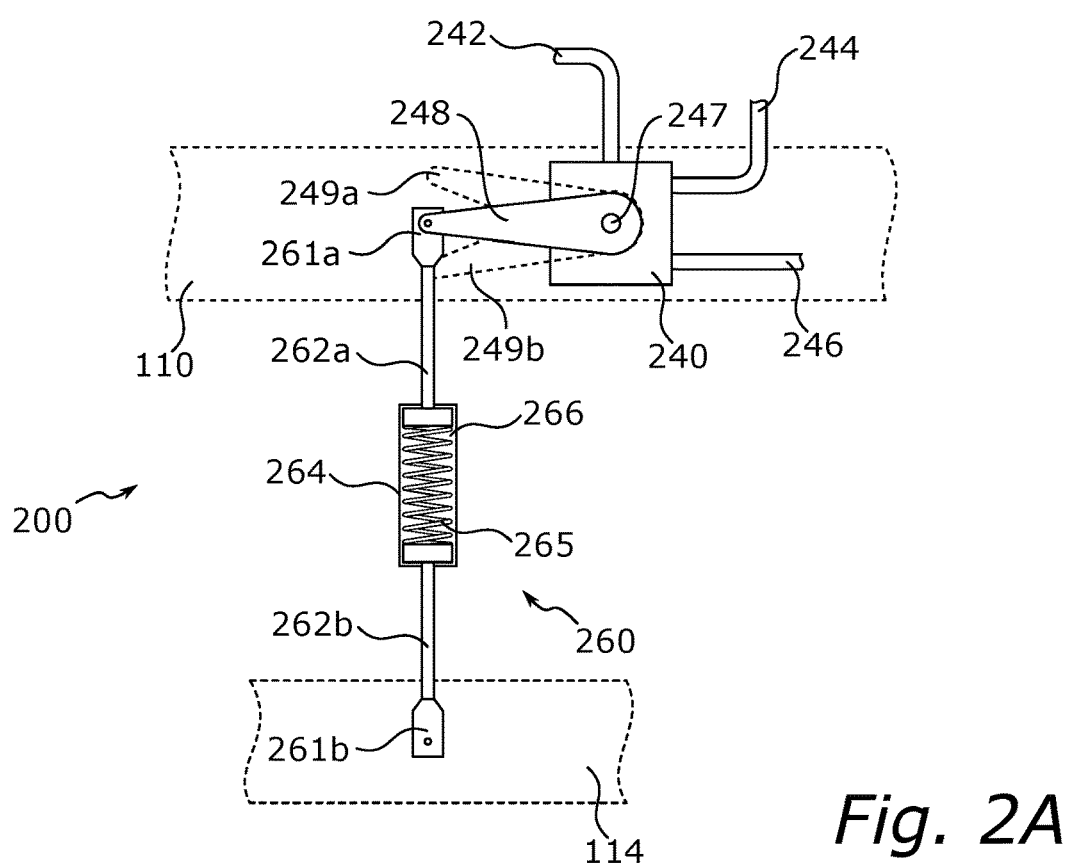
FIG. 2A schematically illustrates embodiments of a leveling valve assembly for an air suspension system according to the present disclosure.

FIG. 2A schematically illustrates embodiments of an improved levelling valve assembly 200 as envisaged herein. The assembly 200 includes an air valve 240, which may be a same as, or similar to, the air valve 140 just described with reference to FIG. 1. The air valve 240 thus also has a supply port 242, an exhaust port 244, and a suspension port 246 for connecting to an air reservoir (or e.g. directly to a compressor, or any other source of preferably compressed air) and air spring as shown in FIG. 1. The air valve 240 has a control arm 248 which is rotatably mounted to the air valve 240 at a pivoting point (i.e. around an axis) 247, and the air valve 240 and control arm 248 are configured such that with the control arm at first and second positions 249a and 249b, the air valve 240 is in the first and second states as described earlier herein with reference to the system 100 illustrated in FIG. 1.

As illustrated in FIG. 2A, the air valve 240 is mountable to one of a sprung and unsprung mass of a vehicle. In the particular example shown in FIG. 2A, the air valve 240 is presumably to be mounted to the chassis no of the vehicle. The assembly 200 further includes a linkage rod assembly 260 which is mounted, in a first end 261a, to the control arm 248, and which is mountable in a second end 261b to the other one of the sprung and unsprung mass of the vehicle. In the particular example shown in FIG. 2A, the second end 261b of the linkage rod assembly 260 is thus presumably to be mounted to the bar 114 of the vehicle.

In contrast to the linkage rod 160 of the system 100 described with reference to FIG. 1, the linkage rod assembly 160 is not just only a rod, but instead includes a spring and damper arrangement 264 which is inserted in between the first and second ends 261a and 261b of the linkage rod assembly 260. More precisely, the linkage rod assembly 260 includes a first linkage rod portion 262a which extends from the first end 261a to the spring and damper arrangement 264, and a second linkage rod portion 262b which extends from the spring and damper arrangement 264 to the second end 261b.

The spring and damper arrangement 264 includes at least one spring element 265 and at least one damping element 266. The spring element 265 may e.g. (as shown in FIG. 2A) be a spring, while the damping element 266 may e.g. be a damping fluid or similar, as commonly included in spring and damper arrangements used for other purposes than as envisaged herein.

Due to the presence of the spring and damper arrangement 264, the linkage rod assembly 260 will not equally translate all relative movements of the bar 114 and chassis 110 into movements of the control arm 248 of the air valve 240. Instead, the arrangement 264 will block or damp movements belonging to one or more certain frequencies or frequency intervals, while not blocking (or damp less) movements belong to other one or more frequencies/frequency intervals. An effect of the arrangement 264 and the assembly 260 is thus that whether a particular movement (as caused by a particular type of event) translates into a movement of the control arm 248 or not may be tuned by proper configuration of the assembly 260. In particular, the assembly 260 and the arrangement 264 may be configured and tuned such that movements caused by actual change of loading (i.e. change of total mass) of the vehicle are allowed to affect the control arm 248 (such that the ride height of the vehicle may be regulated), while movements caused by e.g. uneven road surfaces, acceleration, deceleration/braking, turning, or similar, may be blocked or attenuated, such that the control arm 248 is not rotated (or at least rotated less than would otherwise be the case), which will help to reduce unnecessary air consumption and to thereby improve overall fuel economy of the vehicle.

Figure 2B:
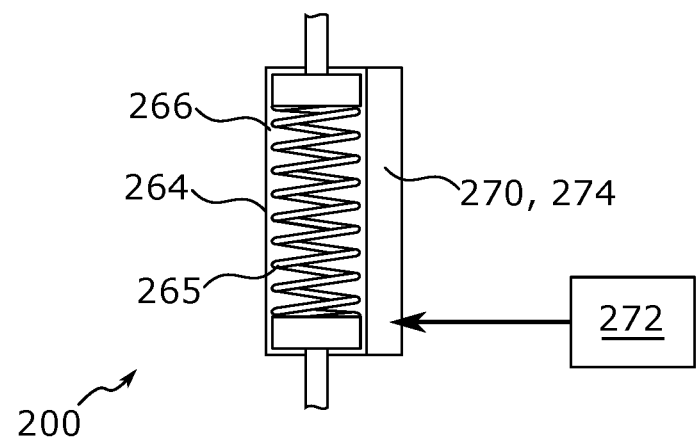
FIG. 2B schematically illustrates alternative embodiments of a spring and damper arrangement as used in the leveling valve assembly of FIG. 2A.

FIG. 2B schematically illustrates various alternative embodiments of the levelling valve assembly 200 and in which another type of spring and damper arrangement 264 is envisaged. In the arrangement 264 shown in FIG. 2B, the spring element 265 may be made of a shape-memory alloy, such that a stiffness of the spring element 265 may be tuned by changing a temperature of the shape-memory alloy. For this purpose, a heating element 270 may be provided, and controlled by a control unit 272. The control unit 272 may be configured to receive indications about e.g. a roughness of a road on which the vehicle is travelling and/or of a lateral and/or longitudinal acceleration of the vehicle. Such indications may be provided e.g. from one or more sensors of the vehicle provided for measuring such parameters (such as acceleration/deceleration, tilt angles, yaw angles, pitch angles, or similar), and/or from a provider (such as an online or offline data service) of relevant road data (e.g. topographical or other data indicative of a road surface, bumps, hills, intersections, weather, temperature, or similar) pertinent to a part of a road along which the vehicle is either currently driving or will soon be driving. Based on such one or more indications, the control unit 272 may be configured to control the heating element 270 such that the stiffness of the spring element 252 may be changed to better block expected unwanted oscillations. For example, if driving on rough roads, and/or if expecting or during acceleration, deceleration and/or turning of the vehicle, the spring element 252 may be heated such that its stiffness is reduced, and such that oscillations caused by these events are thus damped by the arrangement 264 instead of being translated into movement of the control arm 248 of the air valve 240. It should be noted that being able to dynamically adjust the overall damping capability of the arrangement 264, whether an oscillation has a certain frequency or not may be made less important, as extra damping may instead temporarily be applied in situations where there is, or is expected to be, more oscillations due to events not related to an actual loading/unloading of the vehicle.

FIG. 2B also serves to illustrate another possible modification of the arrangement 264, which may be used instead of, or in addition to, the modification including the shape-memory alloy as described above. In this envisaged modification, the damping element 266 is a damping fluid with rheological properties, such that a magnetorheological and/or electrorheological fluid, such that its viscosity may be changed by applying a magnetic and/or electric field in/through the damping fluid. For this purpose, an electromagnet or electric field-generating means 274 may be provided, and controlled by the control unit 272 (or another suitable control unit). Just as in the earlier example, the damping provided by the arrangement 264 may thus be dynamically changed based on the one or more indications received by the control unit 272, here by controlling the applied magnetic and/or electric field, and/or by turning the applied magnetic field on and off as desired.

Figure 2C:
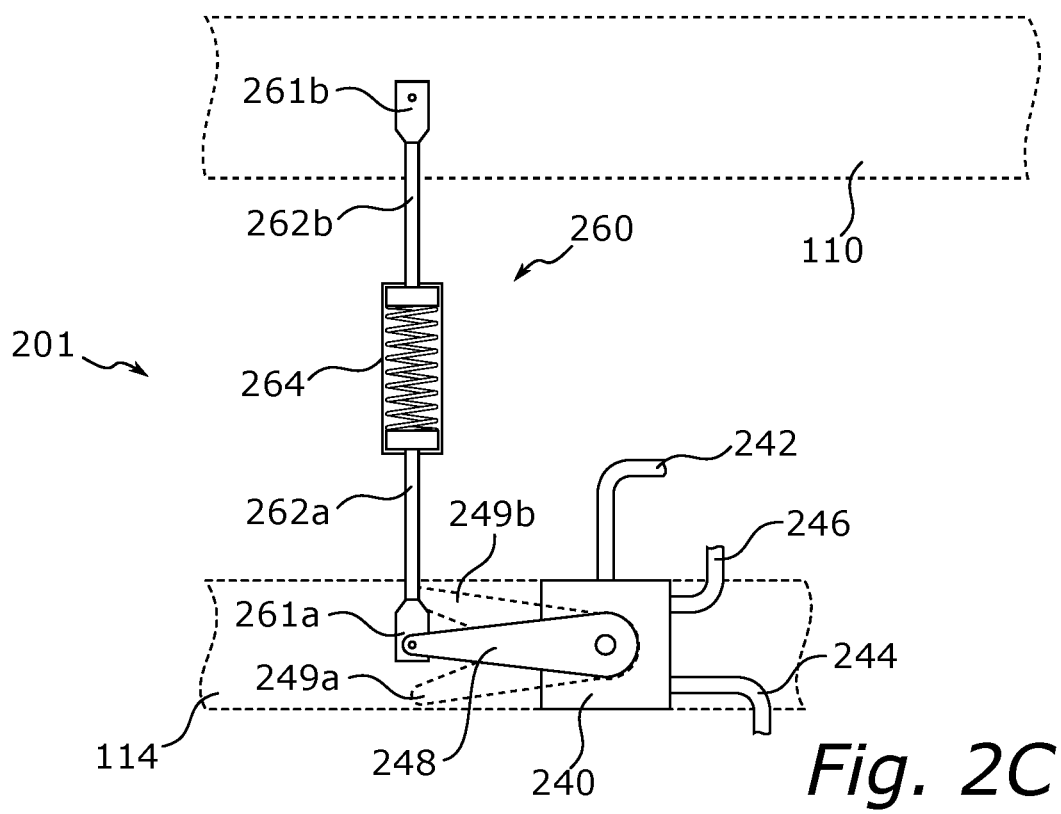
FIG. 2C schematically illustrates an alternative configuration of the leveling valve assembly of FIG. 2A, and FIG. 3 schematically illustrates embodiments of an air suspension system according to the present disclosure.

FIG. 2C schematically illustrates other envisaged embodiments of a similar levelling valve assembly 201, but wherein the air valve is presumably to be mounted to the bar 114 instead of the chassis 110, and where the second end 261b of the linkage rod assembly 260 is to the chassis 110 instead of the bar 114. Otherwise, the functionality of the assembly 201 is the same as that of the assembly 200 described with reference to FIG. 2A, and FIG. 2B mainly serves to illustrate that the exact way of installing the levelling valve assembly as envisaged herein is not that important, as long as the linkage rod assembly 260 and the air valve 240 are installed such that a relative movement/displacement between e.g. a wheel axis and a chassis of the vehicle can be translated into a movement of the control arm of the air valve, but also such that the linkage rod assembly as envisaged herein can provide damping of oscillations at frequencies not related to actual loading/unloading of the vehicle, and/or provide damping during certain time interval in which relative movements not caused by such a change in a mass loading of the vehicle are (or are expected to be) more prevalent.

Figure 3:
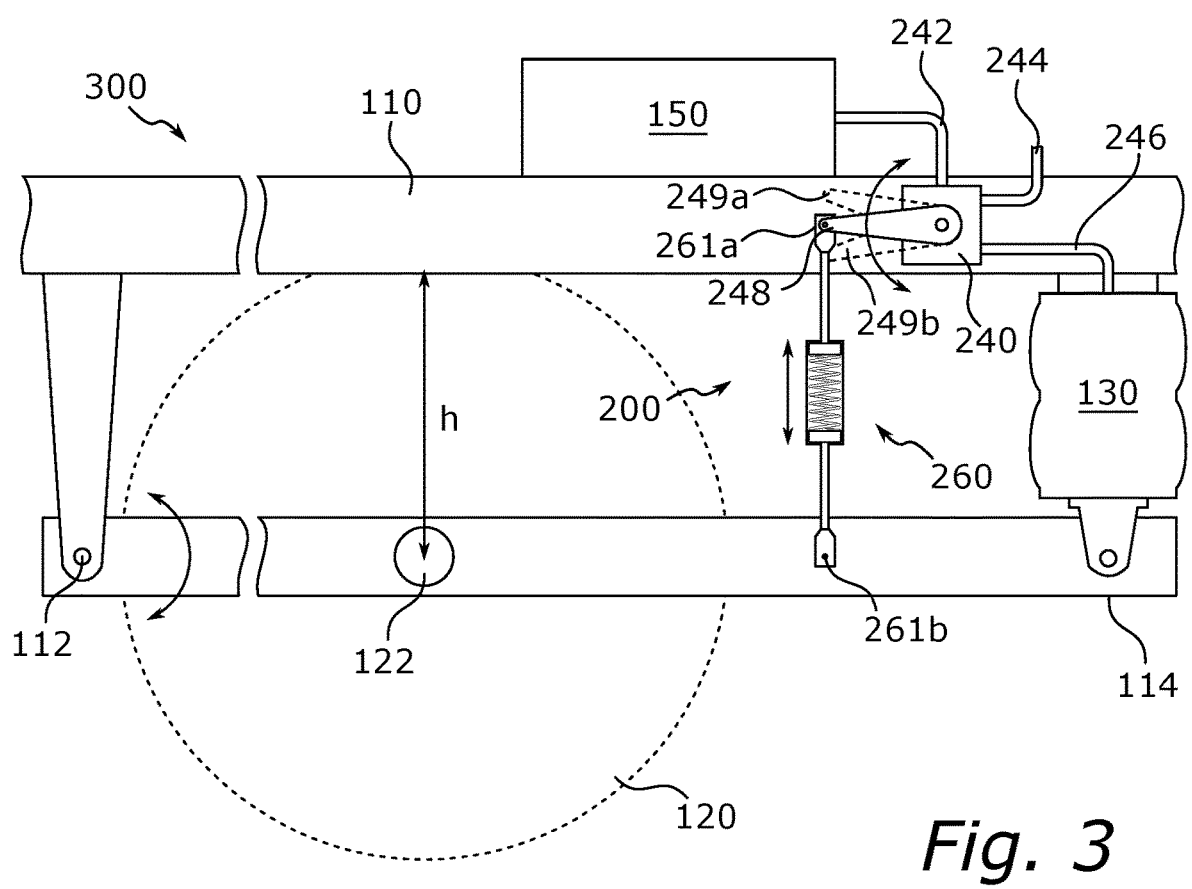

For completeness, FIG. 3 schematically illustrates embodiments of an air suspension system 300 as envisaged herein, wherein a levelling valve assembly 200 (as described e.g. with reference to FIGS. 2B and/or 2C) is included. The air valve 240 is here mounted to the chassis (i.e. the sprung mass) 110 of the vehicle, while the second end 261b of the linkage rod assembly 260 is mounted to the bar (i.e. the unsprung mass) 114 of the vehicle. As discussed with reference to FIG. 2C, in an alternative embodiment of the air suspension system 300, the levelling valve assembly 200 may instead be replaced by the assembly 201, such that the air valve is instead mounted to the unsprung mass, while the second end of the linkage rod assembly is instead mounted to the sprung mass.

Although not specifically illustrated in any Figure of the accompanying drawings, the present disclosure also envisages to provide a heavy vehicle, wherein the heavy vehicle includes an air suspension system as described herein (e.g. the air suspension system 300), wherein the air valve is mounted to one of the sprung mass and unsprung mass, and wherein the second end of the linkage rod assembly is mounted to another one of the sprung mass and unsprung mass of the vehicle, and wherein the air spring is mounted between the sprung mass and unsprung mass of the vehicle (as illustrated e.g. in FIG. 3).

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

In summary of the present disclosure, it is provided an improved way of reducing unnecessary air consumption in an air suspension system used for levelling control of a heavy vehicle, to thereby improve e.g. fuel economy and reduce fuel consumption. In particular, the solution as envisaged herein provides a spring and damper arrangement to the linkage rod, which provides a solution that (in comparison with commonly available solution) is easier and less costly to manufacture, install, and maintain/repair, and which is well suited to be provided as an upgrade to already available air suspension systems, and whose lower cost better corresponds to the gains expected to be had from such improved fuel economy.

The invention claimed is:

1. A leveling valve assembly for an air suspension system of a heavy vehicle, comprising:
    an air valve mountable to one of a sprung mass and unsprung mass of the vehicle, and which includes a supply port, a suspension port, an exhaust port, and a control arm, wherein, using the control arm, the air valve is operable between at least a first state in which the supply port is directed to the suspension port and a second state in which the suspension port is directed to the exhaust port, and
    a linkage rod assembly mounted in its first end to the control arm of the air valve and mountable in its other, second end to another one of the sprung mass and unsprung mass of the vehicle, and configured to translate a relative movement between the sprung mass and unsprung mass of the vehicle into a movement of the control arm, to thereby regulate a ride height of the vehicle,
    wherein the linkage rod assembly includes a spring and damper arrangement inserted in between the first and second ends of the linkage rod assembly, and configured to dampen or block movement of the control arm due to relative movement between the sprung mass and unsprung mass of the vehicle not caused by a change in a mass loading of the vehicle.

2. The leveling valve assembly according to claim 1, wherein an apparent stiffness and/or damping of the spring and damper arrangement is variable.

3. The leveling valve assembly according to claim 2, wherein a spring element of the spring and damper arrangement is a trapezoidal spring.

4. The leveling valve assembly according to claim 2, wherein a spring element of the spring and damper arrangement is made of a shape-memory alloy.

5. The leveling valve assembly according to claim 2, wherein a damping element of the spring and damper arrangement includes a rheological fluid.

6. The leveling valve assembly according to claim 1, wherein the control arm is rotatably mounted to the air valve and configured to operate the air valve between at least the first and second states by rotating around at least one axis.

7. The leveling valve assembly according to claim 4, further including a heating element for heating the spring element, and a control unit configured to control the heating element based on at least one of a received indication of a roughness of a road on which the vehicle is travelling and a received indication of a lateral and/or longitudinal acceleration of the vehicle.

8. The leveling valve assembly according to claim 5, further including means for generating a magnetic and/or electric field in the rheological fluid, and a control unit configured to control said means and the generated magnetic and/or electric field based on at least one of a received indication of a roughness of a road on which the vehicle is travelling and a received indication of a lateral and/or longitudinal acceleration of the vehicle.

9. An air suspension system for a heavy vehicle, comprising:
    a level valve assembly according to claim 1;
    an air spring mountable between a sprung mass and unsprung mass of the vehicle, and connected to the suspension port of the air valve; and
    an air supply connected to the supply port of the air valve.

10. A heavy vehicle comprising an air suspension system according claim 9, wherein the air valve is mounted to one of a sprung mass and unsprung mass of the vehicle, wherein the second end of the linkage rod assembly is mounted to another one of the sprung mass and unsprung mass of the vehicle, and wherein the air spring is mounted between the sprung mass and unsprung mass of the vehicle.

* * * * *